UNITED STATES PATENT OFFICE.

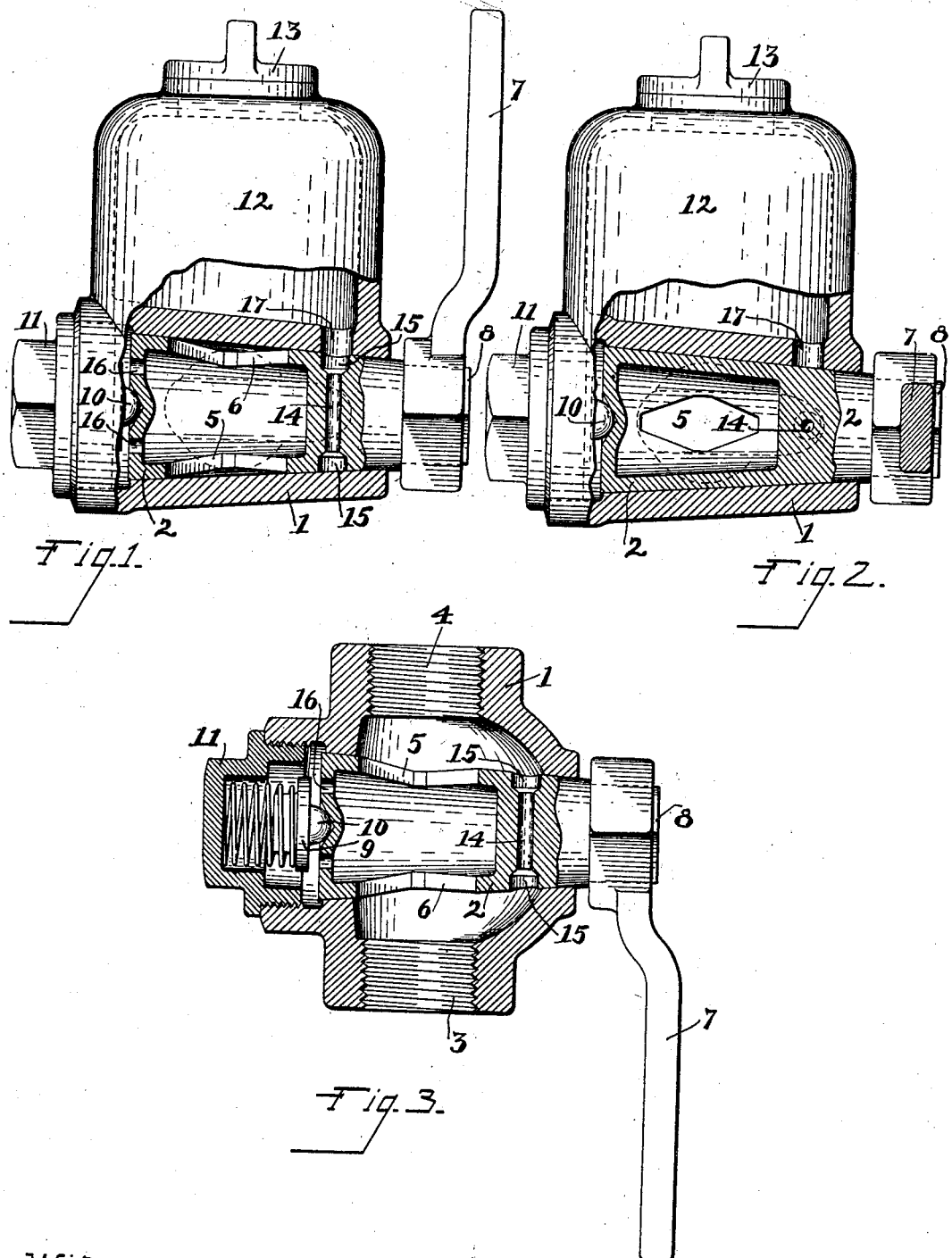

JEROME J. AULL, OF CINCINNATI, OHIO, ASSIGNOR TO THE LUNKENHEIMER COMPANY, OF CINCINNATI, OHIO, A CORPORATION OF OHIO.

COMBINED THROTTLE-VALVE AND LUBRICATOR.

No. 910,445. Specification of Letters Patent. Patented Jan. 19, 1909.

Application filed October 7, 1908. Serial No. 456,590.

*To all whom it may concern:*

Be it known that I, JEROME J. AULL, a citizen of the United States, residing in Cincinnati, county of Hamilton, and State of Ohio, have invented certain new and useful Improvements in a Combined Throttle-Valve and Lubricator, of which the following is a full, clear, and exact description, reference being had to the accompanying drawings, forming part of this specification.

My invention relates to combined air throttle valves and lubricators, such as are used in connection with pneumatic drills and the like, in which the oil is fed to the throttle valve in small quantities, to be carried into the cylinder with the compressed air when the valve is open.

The invention consists of that certain simple and effective construction to be hereinafter particularly pointed out and claimed, in which a passageway is drilled through the valve plug in a line with the valve opening through the plug, and an oil reservoir is provided to feed the oil into the passageway when the valve is closed, and when the valve is open to expose this passageway to the pressure of the incoming air to carry the oil delivered to the plug into the cylinder.

In the drawings Figure 1 is a side elevation, partly in vertical section of my improved construction with the valve closed. Fig. 2 is a similar view with the valve open. Fig. 3 is a central section, taken in a plane at right angles to the section shown in Fig. 2, with the valve open.

1 is the casing, provided with a slightly conical bore to receive the tapered hollow plug 2. The casing is provided with the screw threaded ports 3, 4, for connection with the pipe line, and either port may be used for the inlet. The plug is provided with the usual diamond shape openings 5, 6, for the passage of the air when the valve is open. The plug is turned to open or close the valve by the lever 7, secured on the squared end 8, of the plug, and the plug is held in its seat by the spring pressed plate 9, having a central lug 10, bearing in a recess in the top surface of the plug, the plug being held in position by the screw cap 11, which is hollowed out to allow for the seating of the coiled spring, attached to the plate 9. The holes 16, 16 are bored through the large end of the plug, in order to allow the pressure of the compressed air to equalize itself on the end of the plug. The casing 1 is provided on its upper side with a reservoir 12, closed by the screw cap 13. This reservoir is preferably cast integral with the casing.

14 is a passageway drilled through the body of the plug preferably enlarged at either end at 15, 15. This passageway opens at each end into the inlet and outlet ports of the valve, the passageway being preferably in line with the openings 5 and 6, through the plug.

17 is an oil feed opening, formed through the bottom wall of the reservoir into the plug chamber, in such a position that when the valve is closed, the feed opening 17 will register with the passageway 14, and the oil will feed by gravity and fill up this passageway. In order to insure flow of oil into the passageway, its diameter is enlarged as shown at the ends. When the valve is open, the passageway 14, being in line with the passageway through the plug, the compressed air will force itself through the passageway containing the oil, as well as through the plug openings, and carry the oil into the cylinder.

The construction above described, forms an exceedingly compact and simple arrangement for feeding the lubricating oil to the cylinder in regulated quantities with each operation of the valve. Moreover the construction is very simple to manufacture. All that is needed over the ordinary air throttle valve is to drill a supplemental passageway through the plug in line with the usual openings, secure an oil reservoir on the casing, and provide for a feed opening from the reservoir to register with the supplemental opening in the plug, when the valve is closed.

Having thus described my invention what I claim as new and desire to secure by Letters Patent, is:

1. In a combined throttle valve and lubricator, the combination with an oil reservoir, of a valve casing attached thereto having inlet and delivery ports, a plug seated in said casing having a valve port registering with the inlet and delivery ports, to form a passageway through the valve, a separate oil recess in said plug, and a feed opening from the reservoir registering with the oil recess when the valve is closed, and a passageway for delivering the charge of oil from the recess to the valve passageway when the valve is open.

2. In a combined throttle valve and lubricator, the combination with an oil reservoir, of a valve casing attached thereto having inlet and delivery ports, a plug seated in said casing having a valve port registering with the inlet and delivery ports, to form a passageway through the valve, a separate oil recess in said plug extended through the plug to form a passageway, a feed opening from the reservoir registering with said oil passageway when the valve is closed, and said passageway registering with the valve inlet and delivery ports when the valve is open.

JEROME J. AULL.

Witnesses:
CHAS. C. WURSTER,
FRANK J. ENGLER.